United States Patent [19]

Gurak et al.

[11] 3,878,522

[45] Apr. 15, 1975

[54] TRACKING RECEIVER

[75] Inventors: Richard J. Gurak, Summit; Basil C. Thompson, Lake Hopatcong; Gerald Rabow, Nutley; John P. Filo, Basking Ridge, all of N.J.; Arnold J. Seipel, Plantation, Fla.

[73] Assignee: The United States of America as represented by the Secretary of the Navy, Washington, D.C.

[22] Filed: Aug. 7, 1973

[21] Appl. No.: 386,232

[52] U.S. Cl. .................. 343/117; 343/9; 331/25
[51] Int. Cl. ............................................. G01s 5/02
[58] Field of Search .................. 343/9, 117; 331/25

[56] References Cited
UNITED STATES PATENTS

| | | | |
|---|---|---|---|
| 3,569,853 | 3/1971 | Wolejsza, Jr. ........................ 331/25 |
| 3,713,149 | 1/1973 | Bruner et al. ......................... 343/9 |
| 3,742,361 | 6/1973 | Wason .................................. 331/25 |

*Primary Examiner*—Maynard R. Wilbur
*Assistant Examiner*—T. M. Blum
*Attorney, Agent, or Firm*—R. S. Sciascia; L. I. Shrago

[57] ABSTRACT

A tracking receiver for automatically detecting and phase locking a satellite beacon signal under fixed doppler and high rates of change of doppler. The receiver has a third-order tracking and acquisition loop that includes a cos-limited tangent phase detector which has a phase error range greater than ±120°.

4 Claims, 5 Drawing Figures

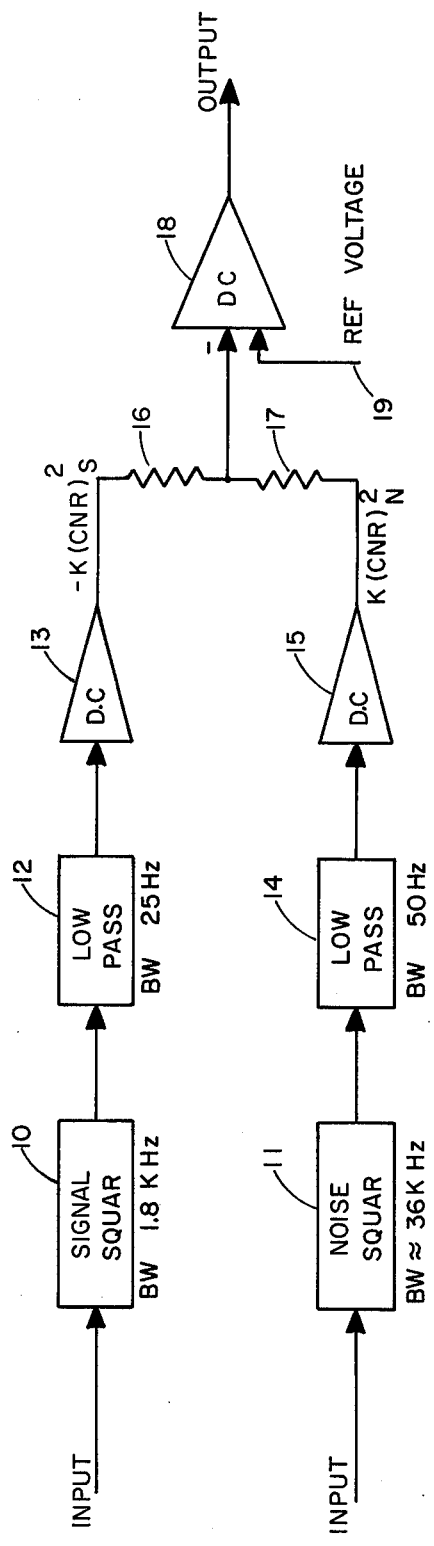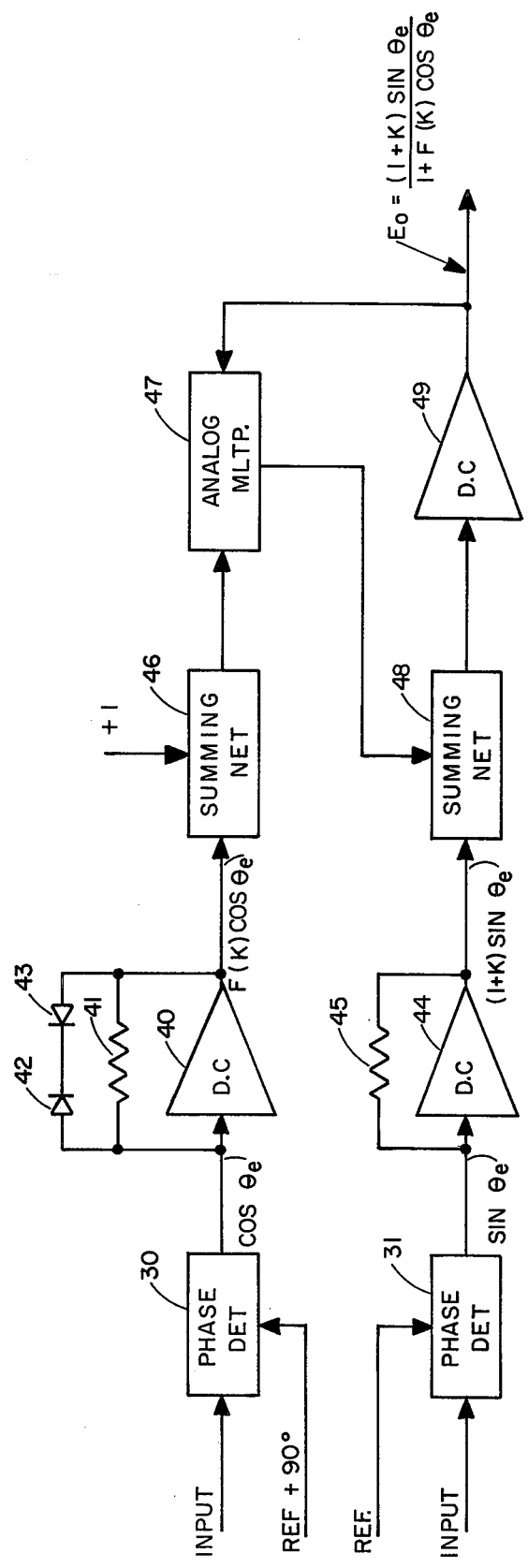

TRACKING RECEIVER

The present invention relates generally to long-range, extra-terrestrial, communication systems, and more particularly, to a receiving arrangement for tracking signals transmitted from an orbiting communication satellite or space vehicle.

There are numerous communication systems which have an orbiting satellite or space vehicle as part of the communication link. The ground receiving apparatus of these systems usually is designed with a tracking feature that utilizes a phase lock loop to detect and lock on the radiated signal. In its fundamental form, this loop usually consists of a phase comparator, a voltage control oscillator and a loop filter.

Associated with the data signals transmitted from such space stations are doppler components due to the satellite motion and any other motions which may occur when the receiving apparatus is not stationary. The magnitude of these doppler shifts and their rate of change are usually only generally known. Consequently, the phase lock loop, for effective operation, must be capable of quickly locking to a phase mismatch condition as large as possible. This locking and its maintenance is further complicated because of the presence of noise peaks at the low signal levels encountered in satellite communication systems.

It is, accordingly, a primary object of the present invention to provide a receiver for tracking a beacon signal originating from an orbiting satellite.

Another object of the present invention is to provide a tracking receiver for use in a satellite communication system which contains a phase lock feature.

Another object of the present invention is to provide a receiving arrangement wherein a beacon signal transmitted from a remote radiating device is detected and phase locked to a locally generated frequency standard.

Another object of the present invention is to provide a communication receiver which utilizes signal detect acquisition and tracking techniques that involve a so-called cos-limited, tangent phase detector and a third-order tracking and acquisition phase loop.

Another object of the present invention is to provide a tracking receiver which operates in a wide frequency search until signal detection and, thereafter, operates at an acquisition frequency sweep to phase lock the detected signal to a locally generated reference frequency standard.

These and other objects, advantages and novel features of the invention will become apparent from the following detailed description of the invention when considered in conjunction with the accompanying drawings wherein:

FIG. 2 is a box diagram of the signal detecting portion of the receiver;

FIG. 3 is a box diagram of a so-called cos-limited "Tanlock" phase detector;

Figure 1:
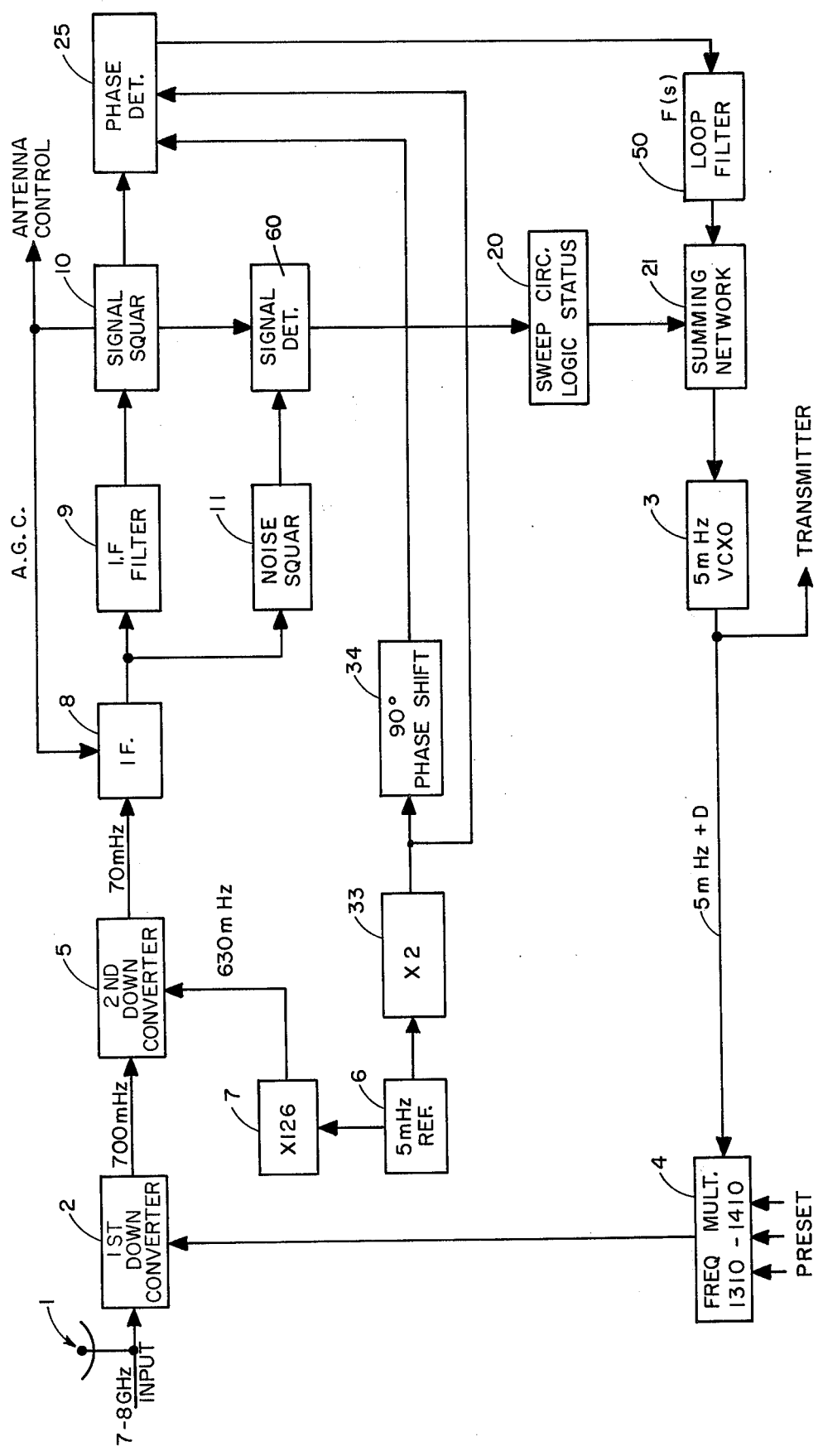
FIG. 1 is a box diagram showing the general arrangement of the tracking receiver.

Referring now to FIG. 1 of the drawings, which shows the general configuration of the tracking receiver of the present invention, it will be seen that the beacon signal transmitted from the orbiting satellite, which in the present case is a carrier with a 800Hz bi-phase modulation, is initially detected by a tracking antenna 1 which is adapted to scan pre-selected sectors of space. The signal so detected which may have a frequency in the range of 7.25 – 7.75gHz plus doppler effects is fed to a first down converter 2 which has as its other input a signal derived from a 5mHz voltage control oscillator 3. This locally generated reference signal is fed to a frequency multiplier 4 which multiplies it by a factor anywhere between 1,310 to 1,410 and provides a major portion of the feedback gain of the tracking loop. The output of the first down converter 2 is, therefore, a signal in the 700mHz range, whose frequency depends upon, of course, the exact multiplying factor selected in the frequency synthesizer 4 and any associated doppler shifts. Thereafter, this signal is fed to a second down converter 5 which has as its other input a 630mHz signal that is also locally generated by multiplying a reference 5mHz signal from source 6 by 126 in circuit 7. The results of this processing is a 70mHz signal input to the IF amplifier 8.

The reference standard for the overall receiving system, the 5mHz source 6, is an atomic clock whose output frequency is extremely stable. Source 6 controls a frequency multiplier 4 and insures the accuracy of the frequency multiplying factors that are manually selected. Multiplier 4, thus, does not introduce any significant frequency error or drift into the system.

After IF amplification, the signal is fed to an IF filter 9 and, thereafter, to a signal squarer 10. By subjecting the IF signal to squaring, the bi-phase modulation on the carrier is removed, and, at the same time, the frequency of the signal is doubled for the phase comparison operation subsequently performed. Filter 9, in one particular modification, had a 1.8kHz band width. The amplified IF signal is also fed to a noise squarer 11 and, thereafter, to a signal detector circuit 60. The purpose of this signal processing is to provide, as will be seen hereinafter, a signal detect condition at a C/KT - carrier to noise power as low as 30db. This is achieved by comparing the $(CNR)_s^2$ signal in a narrow 1.8kHz band width to the $(CNR)_n^2$ in a 36kHz band width.

The manner in which this is accomplished is shown in detail in FIG. 2 where the output of signal squarer 10 is fed to a low pass filter 12 having a band width of only 25Hz. Thereafter, the output of this filter is amplified in dc amplifier 13 to yield a voltage which may be designated $-K(CNR)_s^2$.

Likewise, the output from noise squarer 11 is fed to a low-pass filter 14 whose pass band is 50Hz, double that of filter 12. The output of this filter is likewise amplified in a dc amplifier 15 to yield the quantity $K(CNR)_n^2$. In this case, the dc amplifier is operated in a non-inversion mode manner.

The outputs of the two dc amplifiers are applied to a pair of series resistors 16 and 17 of equal magnitude, and the signal appearing at the juncture of these resistors is fed to a dc operational amplifier 18 at its negative input terminal. Also coupled to this amplifier is a reference voltage 19 whose magnitude is pre-selected to act as the threshold signal detecting level.

The action of summing resistors 16 and 17 is to produce a dc difference voltage, $$E_{dc} = -K[(CNR)_s^2 - (CNR)_n^2]$$

When this voltage exceeds reference voltage 19 then a signal appears in the output of amplifier 18 indicating signal detection.

Normally, when the receiver is in its wide band frequency search mode, the voltage control oscillator 3 has a sawtooth wave form applied to it which is derived from sweep circuit 20 and coupled to its control element through a summing network 21. In this mode of operation, the VCXO, 3, is varied by ±10kHz as determined on the output side of frequency multiplier 4. The slope of this sawtooth accomplishes this frequency sweep in one second. However, whenever a signal appears in the output of amplifier 18, this mode of operation is discontinued and the complementary logic circuits associated with sweep circuit 20 maintain a voltage on oscillator 3 corresponding to the voltage which existed thereat at the time of signal detect. By so locking the oscillator, loop stress due to frequency offset is eliminated.

A predetermined time after signal detect, the acquisition frequency sweep is activated and superimposed on any existing signal detect voltage. This waiting period is incorporated in the system to take advantage of any fortuitous locking which may occur as a result of favorable signal conditions within the loop and to enable the antennas to stop the spacial scan and lock on to the satellite. However, once this time interval expires, sawtooth circuit 20 applies an appropriate voltage wave form to oscillator 3 which causes it to sweep ±2kHz at a rate of ±333Hz per second, again, as measured after multiplication in frequency multiplier 4. This sweep range encompasses the maximum frequency offset of 1.4kHz. This 1.4kHz value represents maximum frequency offset that may be detected at high CNR levels. Once acquisition is achieved, the frequency sweep is discontinued and memory circuits associated with sweep circuit 20 permanently impress a final detect and acquisition sweep voltage on the oscillator 3 until tracking status is changed.

The output of signal squarer 10 also provides the input to the phase detector 25 in the loop circuit. As best seen in FIG. 3, this output is fed to a pair of phase detectors 30 and 31 of conventional design which have quadraturely-phased signals derived from the frequency standard 6 as their other inputs. More specifically, the output from reference standard 6 is doubled in frequency in circuit 33 and, thereafter, the 10mHz signal resulting therefrom is fed directly to phase detector 31 and through a 90° phase shift 34 to phase detector 30. As is well known, the outputs of these detectors are $\cos \theta_e$ and $\sin \theta_e$ where $\theta_e$ represents the phase difference or error between the compared signals.

The tracking receiver utilizes a variation of the so-called "Tanlock" phase detector. For purposes of description, this detector is called a cos-limited tangent phase detector.

Phase detectors 30 and 31, as seen in FIG. 3, form part of this cos-limited tanlock detector. The output of these detectors $\theta_e$, as mentioned hereinbefore, correspond to the sin and cos of the phase difference between $\theta_1$ and $\theta_2$, the compared signals. In the tanlock detector, these signals feed the numerator and denominator inputs of an analog multiplier - divider whose output is in the form of $$E_n = \frac{(1 + K) \sin\theta_e}{1 + F(K) \cos\theta_e} \quad (1)$$

$K$ in the above equation is a parameter less than 1 which may be adjusted as desired. If $K$ is set to equal 0, the equation becomes the conventional sinusoidal phase lock operation, and as the value of $K$ is increased, both the range and the linearity of the characteristic increase. As a value of $K$ equals 1, the equation goes to ± infinity for values of $\theta_e$ equal 180°. It would be pointed out that the name tanlock is derived from similarity between the above function and the trigometric identity.

$$\frac{\sin X}{1 + \cos X} = \tan \frac{X}{2} \quad (2)$$

The term cos-limited tangent phase detector is used to represent the fact that the term $K \cos \theta_e$ is limited so as to prevent the denominator of the output function from reaching 0, a condition which may occur due to noise peaks at low CNR levels. This provision eliminates serious dc offset errors during signal detect and acquisition.

Referring again to FIG. 3, the output of phase detector 30, $\cos \theta_e$, is fed to a dc amplifier 40 having a first feedback path through resistor 41 and a second feedback path through back-to-back Zener diodes 42 and 43. The purpose of these series diodes is to effectively clamp the output signal at symmetrical positive and negative voltage levels corresponding to the combined forward and reverse breakdown voltages of the two diodes. When these diodes break down, it will be appreciated, they effectively shunt feedback resistor 41 and reduce the gain of the amplifier.

The output of dc amplifier 40 is made to correspond to the quantity $F(K) \cos \theta_e$, with the above clamping preventing $F(K)$ from reaching 1.

The output from phase detector 31 which corresponds to $\sin \theta_e$ is likewise fed to an operational amplifier 44 having a feedback resistor 45, and this amplifier is adjusted to yield an output signal corresponding to $(1 + K) \sin \theta_e$.

The signal appearing in the output circuit of amplifier 40 is coupled to a summing network 46 so as to have added to it a reference voltage corresponding to +1 and the signal resulting therefrom which corresponds to $1 + F(K) \cos \theta_e$ is supplied to an analog multiplier 47.

In a similar manner, the signal appearing in the output of amplifier 44 is supplied to a summing network 48 so as to have added to it a signal corresponding to the output signal of analog multiplier 47. The results of this addition is fed to a dc amplifier 49 which has a high gain characteristic. This amplifier provides the output signal from the phase detector 25 as shown in FIG. 1. Additionally, this output signal $$E_n = \frac{(1 + K) \sin\theta_e}{1 + F(K) \cos\theta_e}$$

is also fed back to serve as the other input for analog multiplier 47.

In the usual tanlock circuit, the sin and cos error signals derived from the conventional phase detectors 30 and 31 are treated differently, that is, these signals have a reference voltage added to the cos signal while the sin signal is multiplied by a reference voltage. The signals resulting from this processing are divided to yield the above output signal.

In the system of the present invention, the same results are achieved by utilizing the summing networks 46 and 48, the high gain amplifier 49 and the analog multiplier 47. It can be mathematically shown that when the gain of the amplifier 49 is sufficiently high, its output will, for all practical purposes, be equal to the input to summing network 48 divided by the output from summing network 46.

Figure 4:
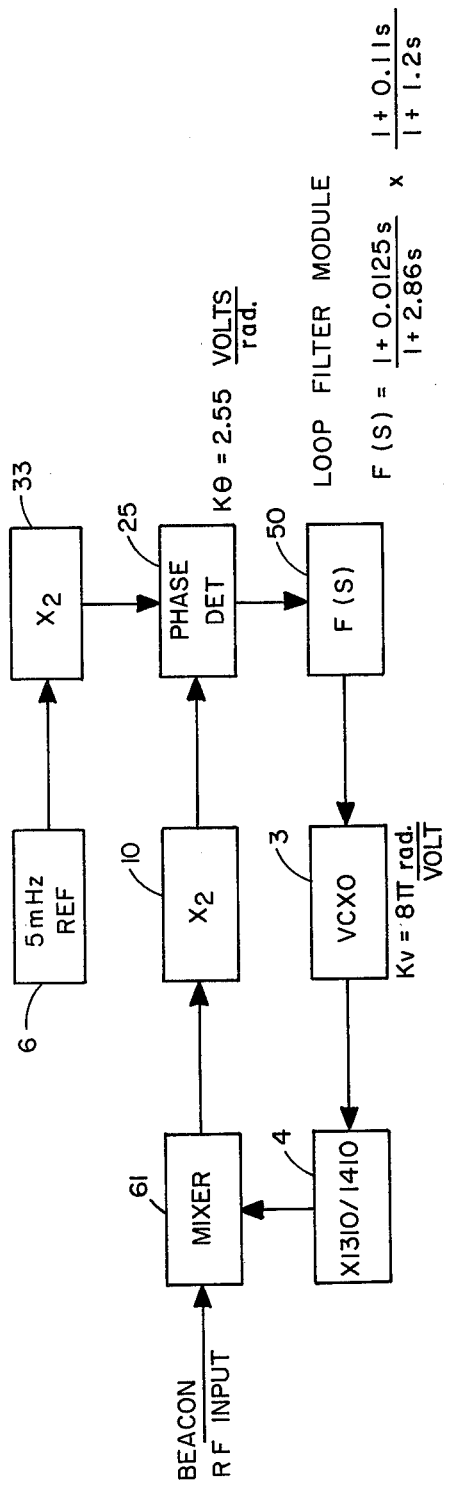
FIG. 4 is a simplified showing of the phase lock loop.

This output voltage, $E_o$, is fed to loop filter 50 and then to the voltage control oscillator 3 to close the loop. In its basic form as shown in FIG. 4, this third-order loop has a high-gain, narrow band width. It should be appreciated that the arrangement shown in this FIG. 4 has been simplified to facilitate a better understanding of the operation and performance of the loop filter module 50 and that, for example, mixer 61 represented as a component of this loop in actual practice comprises those circuits and signal sources of FIG. 1 which are responsible for developing the IF signal which is present in the loop circuit. It achieves approximately 20db additional loop gain at the highest anticipated rate of change of doppler frequency of 1 rad/sec compared to its second-order counterpart. It also enhances acquisition probability by reducing the acceleration phase errors by a factor of 10 to 1 at acquisition. The exact enhance mechanism is one of reducing the "probability of unlock" once the loop has acquired the signal.

Figure 5:
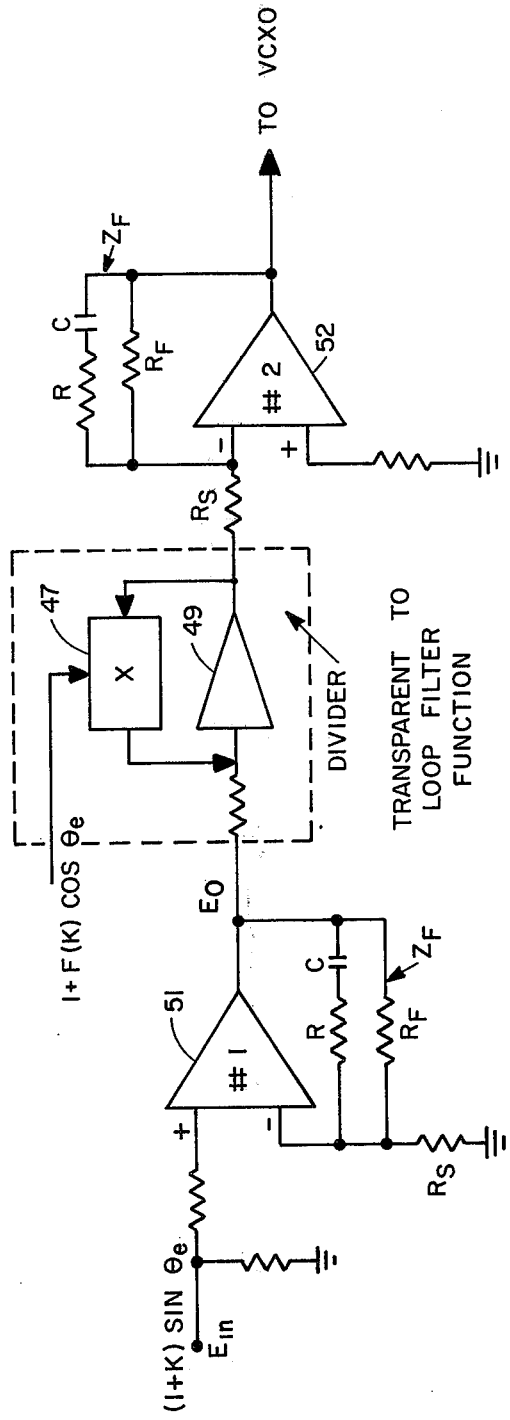
FIG. 5 is a schematic diagram of the circuit which forms the entire loop filter function.

The transfer function of loop filter 50 is $$F(s) = \frac{(1 + s\tau_2)(1 + s\tau_4)}{(1 + s\tau_1)(1 + s\tau_3)} \quad (3)$$

where $s$ is a Laplace complex variable and $\tau_1$, $\tau_2$, $\tau_3$ and $\tau_4$ are time constants of the loop filter in seconds. The loop transfer function $$H_x = \frac{K_L F(s)}{s + K_L (F_x)} \quad (4)$$

where $K_L = 180,000$ rad/sec
This function contains a third-power Laplace complex variable in its denominator, and it is the presence of this term which classifies the loop as a third-order loop. In a preferred modification of the invention, $\tau_1$ was 2.86, $\tau_2 - 0.0125$, $\tau_3 - 1.2$ and $\tau_4 - 0.11$. With this transfer function, the following tracking system constants were obtained:
   Damping factor $= \zeta = 0.5$
   Single sided loop band width $= B_1 = 40$Hz
   Loop natural resonant frequency $= W_n = 80$ rad/sec
More specifically, loop filter 50, as shown in FIG. 5, includes a first operational amplifier 51 operating in the non-inverting mode and a second operational amplifier 52 operating in the inverting mode. Amplifier 51 has an impedance $Z_f$ associated with its feedback circuit which is made up of resistor $R_f$ in parallel with the series combination of resistor R and capacitor C. This circuit is connected between the output and the negative input terminal, which is grounded through resistor $R_s$. The input signal to this amplifier, which corresponds to $(1 + K) \sin \theta_e$, is obtained from phase detector 31. In a preferred embodiment of the invention, $R_s = 1,000$ ohms, $R_f = 51$kohms, $R = 5.1$kohms, $C = 23$uf. For these parameters, it can be shown that $$\frac{E_o}{E_{in}} = \frac{R_F}{R_s} \cdot \frac{1 + (CR)s}{1 + [C(R + R_F)]s} = \frac{1 + \tau_2 s}{1 + \tau_1 s} \quad (4)$$

$$= \frac{R_F}{R_s} \cdot \frac{*1 + (.0125)s}{1 + (2.86)s} = \frac{1 + j.0125\omega}{1 + j\,2.86\omega} \quad (5)$$

*which is the first term of $F(s)$ in equation (3)

The output from amplifier 51 is fed to a divider circuit which is transparent to the loop filter function. This divider circuit, which is illustrated in a slightly different form in FIG. 3, has its dc amplifier 49 inserted in this portion of the loop circuit as a convenient way of introducing into the filtering system the signal $1 + F(K) \cos \theta_e$ which is the denominator of equation (1), defining the output of the tanlock phase detector.

The output of the dc amplifier 49 is supplied to the second operational amplifier 52. Associated with this second operational amplifier is a similar feedback impedance $Z_f$ consisting again of $R_f$ in parallel with resistor R and capacitor C in series. Thus, $\tau_1$ and $\tau_3 = C(R + R_f)$ and $\tau_2$ and $\tau_4 = CR$. In the preferred embodiment of this amplifier $R_s = 75$kohms, $R_f = 382$kohms, $R = 1.69$kohms, $C = 7.5$uf.

Utilizing the same relationships as specified in connection with operational amplifier 51, it can be shown that $$\frac{E_o}{E_{in}} = \frac{R_F}{R_s} \cdot \frac{*1 + 0.11s}{1 + 1.2s} = \frac{1 + j\,0.11\omega}{1 + j\,1.2\omega}$$

*which is the second term of $F(s)$ in equation (3)

With the receiving system disclosed, signal acquisition exceeding 90% probability may be achieved in the presence of an acceleration 500Hz/sec$^2$ sinusoidal rate of change of doppler, ±10kHz doppler shift and a $C/KT$ as low as 36db. This 90% probability is a result of the self-adaptive high gain, narrow band width, stable third-order loop and the cos-limited tangent phase detector operating in the sawtooth sweep detection and acquisition modes. It would be pointed out the tanlock phase detector has a phase lock range greater than ±120° as compared to the ±90% of conventional circuits. It also has a more linear and greater dynamic output capability.

It would be pointed out that tracking error information for pointing the antenna at the satellite may be obtained from the receiver's automatic gain control circuit. Also, negative doppler correction information for the transmitter loop may be obtained from the tracking loop to correct for frequency errors caused when, for example, the receiver is part of a shipboard system. The 5mHz VCXO contains positive doppler information, that is, the changes in frequency of this oscillator due to doppler are in the same direction of the doppler shifts themselves. A doppler correction circuit, now shown, inverts this doppler to a negative doppler and, thereafter, a subsequent frequency multiplication in a 1310 to a 1410 multiplier prepares this signal for a mixing operation to produce a 7 to 8gHz signal for transmission back up to the satellite.

What is claimed is:

1. In a receiver for tracking a signal radiated from a remote source, a tracking and acquisition loop comprising:
 a voltage controlled local oscillator;
 means for multiplying the frequency from the local oscillator by a pre-selected number;
 means for mixing the signal from said remote source with said multiplied signal so as to produce an IF signal;
 a cos-limited tangent phase detector having two pairs of input circuits and an output circuit,
  said cos-limited tangent phase detector being controlled such that the output signal therefrom is prevented from increasing in magnitude beyond a predetermined level;
 means for producing a pair of quadraturely phased reference signals at the IF frequency;
 means for feeding said IF signal and one of said reference signals to one pair of input circuits and for feeding said IF signal and the other of said IF signals to the other pair of input circuits of said cos-limited tangent phase detector;
 a filter; and
 means for feeding the output signal developed in the output circuit of said cos-limited tangent phase detector to the input of said filter and for feeding the output of said filter to the control element of said voltage controlled local oscillator.

2. In an arrangement as defined in claim 1 wherein said filter has a transfer function such that the loop in which it is disposed which includes said local oscillator, said means for multiplying the frequency thereof and said cos-limited tangent phase detector is a third-order loop.

3. In a receiver for tracking a signal radiated from a remote source and for locking on to said signal a phase-lock loop comprising, in combination
 a voltage controlled local oscillator;
 means for multiplying the frequency of the signal produced by said local oscillator by a preselected number;
 means for mixing the signal radiated by said remote source with said multiplied signal so as to produce an IF signal;
 a cos-limited tangent phase detector;
 means for generating a pair of quadraturely phased reference signals at the IF frequency;
 means for feeding said quadraturely phased reference signals and said IF signal to said cos-limited tangent phase detector,
  whereby an output signal generally corresponding to $(1 + K) \sin\theta_e/1 + F(K) \cos\theta_e$ is produced where $K$ is a constant and $\theta_e$ is the phase error between said reference signal and said IF signal;
 means for controlling the operation of said cos-limited tangent phase detector such that the quantity $1 + F(K) \cos\theta_e$ is prevented from equaling 0;
 a filter; and
 means for feeding the output signal from said cos-limited tangent phase detector to the input of said filter and for coupling the output thereof to the control element of said local oscillator,
  said filter, said local oscillator and said cos-limited tangent phase detector being part of a third order loop.

4. In an arrangement as defined in claim 3 wherein said filter has a transfer function $$F(s) = \frac{(1 + s\tau_2)(1 + s\tau_4)}{(1 + s\tau_1)(1 + s\tau_3)}$$

where $\tau_1, \tau_2, \tau_3, \tau_4$ are different time constants and $s$ is the Laplacian operator.

* * * * *